United States Patent
Rahman

(10) Patent No.: US 7,715,340 B2
(45) Date of Patent: May 11, 2010

(54) METHOD AND APPARATUS FOR ENABLING IP MOBILITY WITH HIGH SPEED ACCESS AND NETWORK INTELLIGENCE IN COMMUNICATION NETWORKS

(75) Inventor: Moshiur Rahman, Marlboro, NJ (US)

(73) Assignee: AT&T Corp., New York, NY (US)

( * ) Notice: Subject to any disclaimer, the term of this patent is extended or adjusted under 35 U.S.C. 154(b) by 1047 days.

(21) Appl. No.: 11/071,425

(22) Filed: Mar. 3, 2005

(65) Prior Publication Data

US 2005/0195767 A1    Sep. 8, 2005

Related U.S. Application Data

(60) Provisional application No. 60/550,030, filed on Mar. 4, 2004.

(51) Int. Cl.
  *H04W 4/00* (2009.01)
(52) U.S. Cl. .................. 370/328; 726/15; 709/227; 709/239; 455/439
(58) Field of Classification Search ................ 455/421, 455/437, 439; 709/223, 227, 238; 370/328
See application file for complete search history.

(56) References Cited

U.S. PATENT DOCUMENTS

| 4,045,802 | A | 8/1977 | Fukazawa et al. |
| 4,074,324 | A | 2/1978 | Barrett |
| 4,937,676 | A | 6/1990 | Finelli et al. |
| 5,408,746 | A | 4/1995 | Thoman et al. |
| 5,444,468 | A | 8/1995 | Fukushima et al. |
| 7,046,647 | B2 * | 5/2006 | Oba et al. .................. 370/331 |
| 7,068,640 | B2 * | 6/2006 | Kakemizu et al. ........... 370/349 |
| 7,072,657 | B2 * | 7/2006 | Watanabe et al. ........... 455/439 |
| 7,110,375 | B2 * | 9/2006 | Khalil et al. ................ 370/331 |
| 7,246,373 | B1 * | 7/2007 | Leung et al. .................. 726/15 |
| 7,421,736 | B2 * | 9/2008 | Mukherjee et al. ........... 726/15 |
| 7,526,658 | B1 * | 4/2009 | He et al. ..................... 713/193 |
| 2003/0220107 | A1 * | 11/2003 | Lioy et al. ............... 455/435.1 |
| 2003/0224788 | A1 * | 12/2003 | Leung et al. ............. 455/435.1 |
| 2004/0073642 | A1 * | 4/2004 | Iyer ........................... 709/223 |
| 2004/0266420 | A1 * | 12/2004 | Malinen et al. ............. 455/421 |
| 2005/0198380 | A1 * | 9/2005 | Panasyuk et al. ........... 709/239 |
| 2005/0249210 | A1 * | 11/2005 | Heller ........................ 370/389 |
| 2008/0040793 | A1 * | 2/2008 | Nilsen et al. .................. 726/15 |
| 2008/0151808 | A1 * | 6/2008 | O'Neill ...................... 370/312 |

(Continued)

FOREIGN PATENT DOCUMENTS

EP    1 176 781 A2    1/2002

(Continued)

OTHER PUBLICATIONS

European Search Report, Dated Sep. 2, 2005, Application No. EP 05 10 1709, 2 pages.

(Continued)

*Primary Examiner*—Charles N Appiah
*Assistant Examiner*—Joy K Contee

(57)    ABSTRACT

An architecture for network layer mobility support, using always on broadband high speed access and a network-based mobility manager, termed as a network server or gateway is disclosed. The present invention obviates the need of MIP for IP mobility.

17 Claims, 4 Drawing Sheets

U.S. PATENT DOCUMENTS

2008/0200168 A1* 8/2008 Jiang ..................... 455/432.1
2008/0228942 A1* 9/2008 Lor et al. .................... 709/238

FOREIGN PATENT DOCUMENTS

| EP | 1 176 781 A3 | 1/2002 |
| GB | 2263841 | 8/1993 |
| JP | 02188259 | 7/1990 |
| JP | 06064160 | 3/1994 |
| WO | WO 91/14336 | 9/1991 |
| WO | WO 98/18253 | 4/1998 |
| WO | WO 03/045034 A1 | 5/2003 |

OTHER PUBLICATIONS

Chuah M. C., et al. "Mobile Virtual Private Dial-Up Services", Bell Labs Technical Journal, Wiley, CA, vol. 4, No. 3, Jul. 1999, pp. 51-72.

\* cited by examiner

METHOD AND APPARATUS FOR ENABLING IP MOBILITY WITH HIGH SPEED ACCESS AND NETWORK INTELLIGENCE IN COMMUNICATION NETWORKS

This application claims the benefit of U.S. Provisional Application No. 60/550,030 filed on Mar. 4, 2004,which is herein incorporated by reference.

The present invention relates generally to communication networks and, more particularly, to a method and apparatus for enabling IP mobility with high speed access and network intelligence in packet networks, e.g., Internet Protocol (IP) networks.

BACKGROUND OF THE INVENTION

The idea of Mobile Internet Protocol (MIP) is to provide mobile users the ability to access the Internet anywhere wirelessly, with an identical IP address assigned to the mobile user's wireless device. With rapid changes in both technology and the communication environment, high bandwidth and low cost wireless LAN (WLAN) have emerged as a competitive choice not only for wireless high speed Internet access but also for wireless voice network access. To support mobility with Quality of Service (QoS), current MIP proposals have been found to be inefficient to support both data and time sensitive services, such as Voice-over-IP (VoIP).

In a mobile network environment, a mobile user typically accesses the network, such as the Internet, via his home network equipped with an Access Point (AP). An AP is a device that serves as a communications hub for wireless endpoint devices and provides a connection to the wired network, such as the Internet. From time to time, the mobile user needs to travel outside the home network covered by the home AP to another location covered by a foreign AP. MIP is used to support such mobility when a mobile user travels from one AP to another AP.

Some MIP implementations introduce unacceptable processing and transmission delay using IP packet encapsulation scheme, i.e. encapsulate an original IP packet by the home AP in another IP packet to be forwarded to a foreign AP, in order to preserve the original IP address and are not suitable for packet voice applications, such as VoIP services. Other implementations propose more efficient handling of IP packet forwarding from the home AP to a foreign AP; however, these implementations cannot preserve the original IP address assigned to the mobile user by the home AP. More importantly, existing connections already in use by the mobile user cannot be preserved when the user travels from the range of one mobile Access Point (AP) to the range of another AP and also the current IP address of the user device cannot be preserved.

Therefore, a need exists for a method and apparatus for enabling IP mobility with high speed access and network intelligence in communication networks.

SUMMARY OF THE INVENTION

In one embodiment, the present invention supports network layer mobility, using broadband high speed access networks and a network-based mobility manager, termed as a network server. The present invention obviates the need of MIP for IP mobility. The present invention supports efficient packet forwarding from the home mobile network to a foreign mobile network, using existing Virtual Private Network (VPN) technologies, when a mobile user is traveling between networks and preserves the original IP address assigned to the user's mobile device by the home mobile network. A VPN is a way to provide remote access between particular locations via public networks, such as the Internet, using tunnels. VPN technologies that are applicable to the present invention include, but are not limited to, Asynchronous Transfer Mode (ATM) virtual circuits (VC) or virtual paths (VP), Frame Relay (FR) VC, and Multi-Protocol Label Switching (MPLS) Label Switched Paths (LSP). More importantly, all existing connections in use by the user are preserved during the travel from an area served by a home AP to another area served by a foreign AP. In particular, every AP in the mobile network uses a pre-established VPN tunnel to the network server to facilitate mobile networking among all APs supported by the network server.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The idea of Mobile Internet Protocol (MIP) is to provide mobile users the ability to access the Internet anywhere wirelessly, with an identical IP address assigned to the mobile user's wireless device. To support mobility with Quality of Service (QoS), current MIP proposals have been found to be inefficient to support both data and time sensitive services, such as Voice-over-IP (VOIP).

To address this need, in one embodiment the present invention supports network layer mobility, using broadband high speed access networks and a network-based mobility manager, termed as a network server. The present invention obviates the need of MIP for IP mobility. The present invention supports efficient packet forwarding from the home mobile network to a foreign mobile network, using existing Virtual Private Network (VPN) technologies, when a mobile user is traveling between networks and preserves the original IP address assigned to the user's mobile device by the home mobile network. A VPN is a way to provide remote access between particular locations via public networks, such as the Internet, using tunnels. VPN technologies that are applicable to the present invention include, but are not limited to, Asynchronous Transfer Mode (ATM) virtual circuits (VC) or virtual paths (VP), Frame Relay (FR) VC, and Multi-Protocol Label Switching (MPLS) Label Switched Paths (LSP). More importantly, all existing connections in use by the user are preserved during the travel from an area served by a home AP to another area served by a foreign AP. In particular, every AP in the mobile network uses a pre-established VPN tunnel to the network server to facilitate mobile networking among all APs supported by the network server.

The present invention discloses an access and network assisted intelligent server-based architecture that provides network-layer mobility to leverage the changing high speed access and backbone network. Several features of the present invention include:

- establishment of VPN tunnels to provide always on high speed broadband access connectivity between an AP and the network server. This is easily achieved using existing broadband access technologies, such as DSL or cable or broadband wireless loops. The key here is to connect the AP to a network server serving a regional network with high speed connectivity employing VPN tunnels to leverage the network intelligence in facilitating IP mobility. WLANs distributed in different locations interconnected by the Internet or voice network will appear in the same subnet, and the same network resources will be available to all WLANs, irrespective of their locations.
- a network server or gateway for location update and IP mobility support. The network server has all the intelligence needed for the mobility management.
- all the APs are pre-provisioned with the server in the network before the operation. The network server knows the list of IP addresses of all APs for a given service provider's network.

Figure 1:
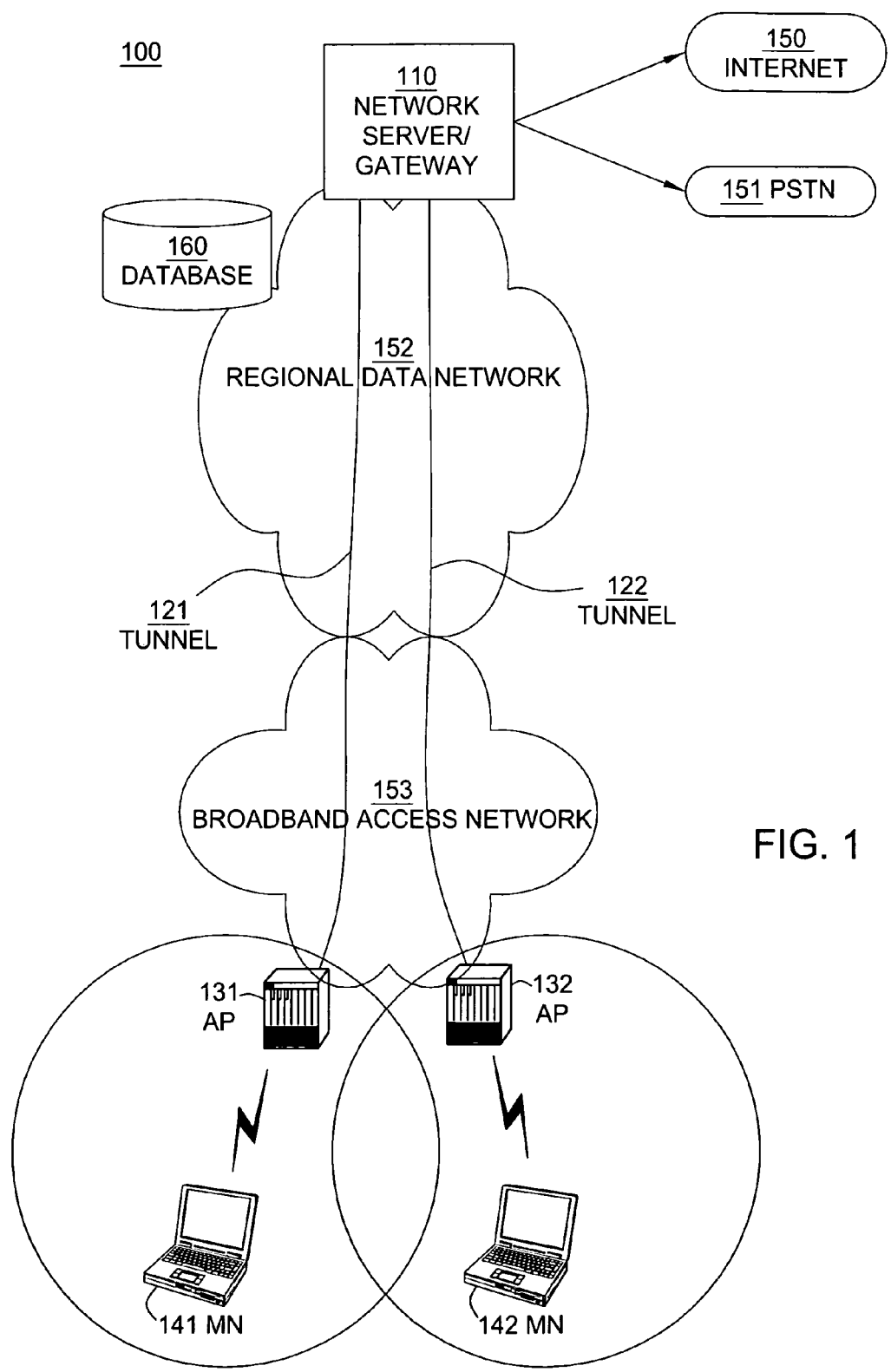
FIG. 1 illustrates an exemplary network using a network server for supporting IP mobility related to the present invention.

FIG. 1 illustrates an exemplary network using a network server for supporting IP mobility related to the present invention. Network 100 contains a network server 110, which is connected to the regional network 152. Regional network 152 is connected to various types of broadband access networks 153, such Digital Subscriber Loop (DSL) networks, Cable networks, as well as wireless access loop networks. Each type of broadband access network 153 is connected to one or more AP devices. Network server 110 is connected to AP 131 and 132 via regional network 152 that in turn is connected to broadband access network 153. VPN tunnel 121 is established between AP 131 and network server 110 and VPN tunnel 122 is established between AP 132 and network server 110. The VPN tunnels can be in the form of, but are not limited to, ATM VC or VP, FR VC, and MPLS tunnel. Also shown in FIG. 1 are a number of Mobile Nodes (MN), e.g., cellular phones, pagers, laptops, personal digital assistants (PDAs) or any other computing devices. MN 141 is being served by AP 131, and MN 142 by AP 132. In one embodiment, the AP may be implemented as at least one of: a DSL modem, a cable modem, a router, a Network Address Translator, a cable TV set top box, and any other network interface devices that connect the user and the network. The network server 110 may also have access to other networks, e.g., the internet 150, a public switched telephone network (PSTN) 151 and the like.

In one embodiment, the communication network 100 can be an IP network. An IP network is broadly defined as a network that uses IP protocol.

To support mobility, two basic operations for mobility management are supported by the mobile AP: Agent Discovery and Registration. The Agent Discovery process intends to advertise the availability of mobility management agents (e.g., AP) for services on each wireless link. For example, the existing discovery procedure in the current WLAN, such as IEEE 802.11 based WLAN, can be employed as an Agent Discovery process. Upon finding a mobility agent using the Agent Discovery process, such as an AP local to the MN's current location, the Registration process is triggered. In the present invention, the registration process simply registers a MN and a MN is always associated with a particular home AP. If the MN travels outside of the home AP coverage area to another area covered by a foreign AP, the MN will have to register again and the registration process simply lets the network server 110 know about the location change of a Mobile Node (MN) via the current AP. This is very simple in terms of message transactions. One aspect of the present invention is that the AP does not have to maintain any address mapping information at all. All the address maintenance and translation are performed in the network by the network server 110. The network server keeps track of the home AP of a MN and performs the appropriate packet forwarding to a foreign AP when the MN travels into the foreign AP coverage area.

For instance, AP 131 is the home AP of MN 141. MN 141 is assigned an IP address A by home AP 131. Through the registration process, network server 110 registers that MN 141 with IP address A is associated with AP 131. All incoming IP packets destined to MN 141 with destination IP address A is forwarded through and by network server 110 using VPN tunnel 121 to AP 131 and then to MN 141. Then MN 141 travels outside of its home area to an area served by AP 132, MN 141 will register with AP 132 using the registration process and AP 132 in turn will inform network server 110 that MN 141 is now served by AP 132. From this point on, network server 110 will then forward all IP packets destined to MN 141 with destination IP address A using VPN tunnel 122 to AP 132 and then to MN 141. In this scenario, the IP address A of MN 141 remains unchanged throughout the entire process. This contributes to less address mapping related traffic between network server 110 and APs 131 and 132 as well as MN 141.

The network server 110 will maintain a table for location management and routing, where each entry is identified by the tuple: <permanent MN IP address, home AP IP address, new AP IP address, association lifetime>. The network server can, on demand, consult database 160 as shown in FIG. 1, connected via the high speed backbone network, for any address resolution or any other needs such as authentication, security and billing. If the network server knows about the move of the MN based on the location management and routing table, then the packet will be sent to the AP serving the MN. If the network server 110 is not aware of the move, the packets will be sent to the home AP, assuming that the MN did not move form its home area. The network server updates the routing table when the association time has expired for the visiting MN.

When a MN powers up in a WLAN area, it listens to beacon signals transmitted from the AP and sends a registration message to the AP from which it detects the strongest signal. The AP uses the pre-established permanent virtual circuit (PVC) to forward the registration message to the server. When the network server receives the registration message, it updates the location management and routing table by associating the MN's IP address with the AP IP address from which the registration message was received. If the AP IP address is not the MN's home AP address, the server may optionally notify the home AP about the move. The network server's packet redirection functionality will send all the packets destined to the MN to the new AP serving the MN.

Figure 2:
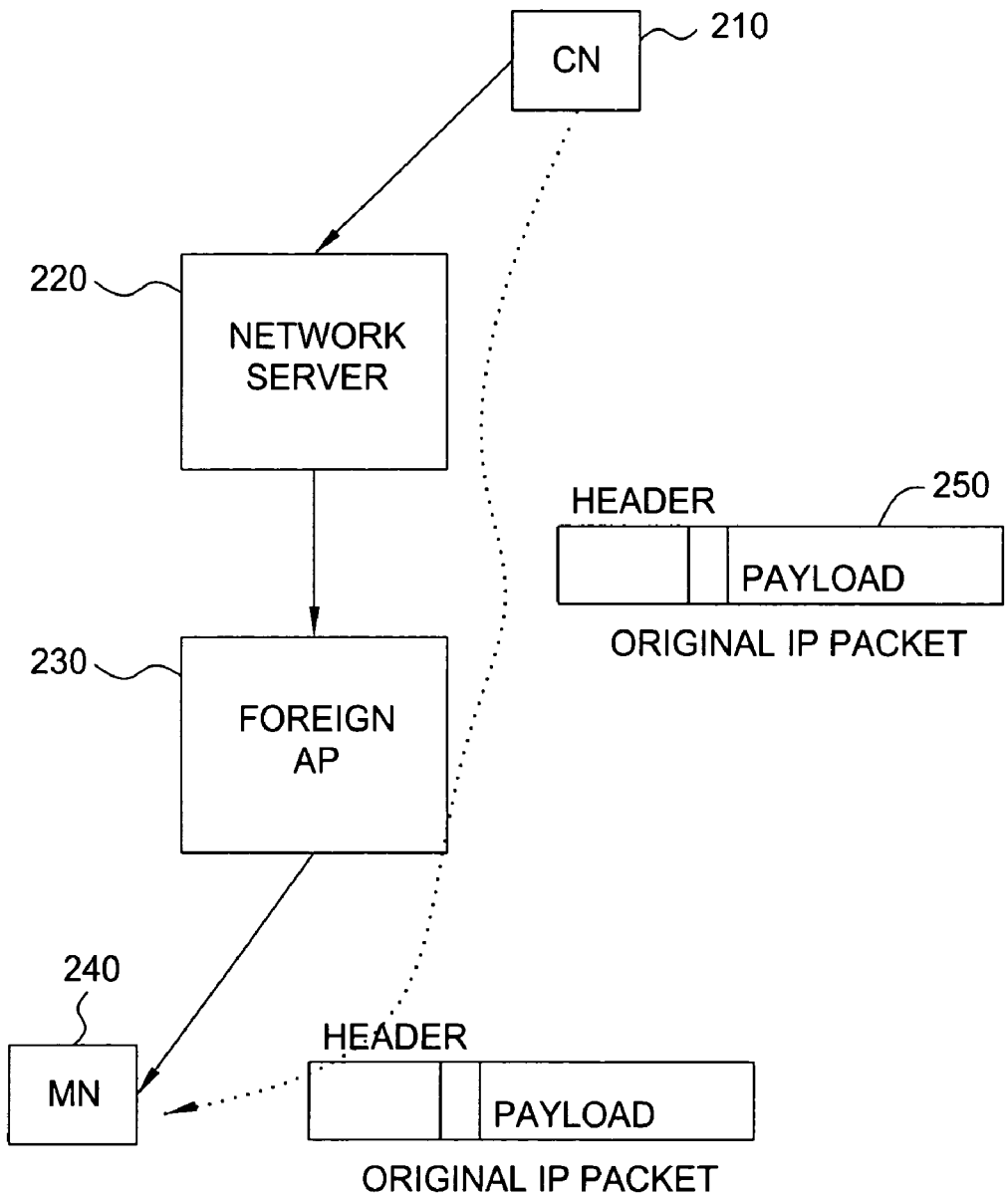
FIG. 2 illustrates an example of routing an original IP packet using a VPN tunnel destined to a mobile node served by a foreign Access Point of the present invention.

The present invention has straight forward routing and a reduced payload size, as shown in FIG. 2, e.g., without any IP packet within another IP packet type encapsulation. FIG. 2 illustrates an example of routing an original IP packet using a VPN tunnel destined to a mobile node served by a foreign Access Point of the present invention. It is also envisioned that the network server based solution operates at multigigabit speeds and the packet redirection functionality is implemented with the network server's traffic discrimination capability. In other words, the redirection capability will be invoked only for the selective incoming IP traffics. In FIG. 2, MN 240 has travelled into a location served by Foreign AP 230. Correspondent Node (CN) 210, the source node of traffic destined to MN 240, sends data using IP packets to MN 240. When network server 220 receives such packets from CN 210 to MN 240, network server 220 will forward these packets via a pre-established VPN tunnel between AP 230 and network server 220. The original IP packets destined to MN 240 from CN 210 remains unchanged when forwarded using the pre-established VPN tunnel.

Figure 3:
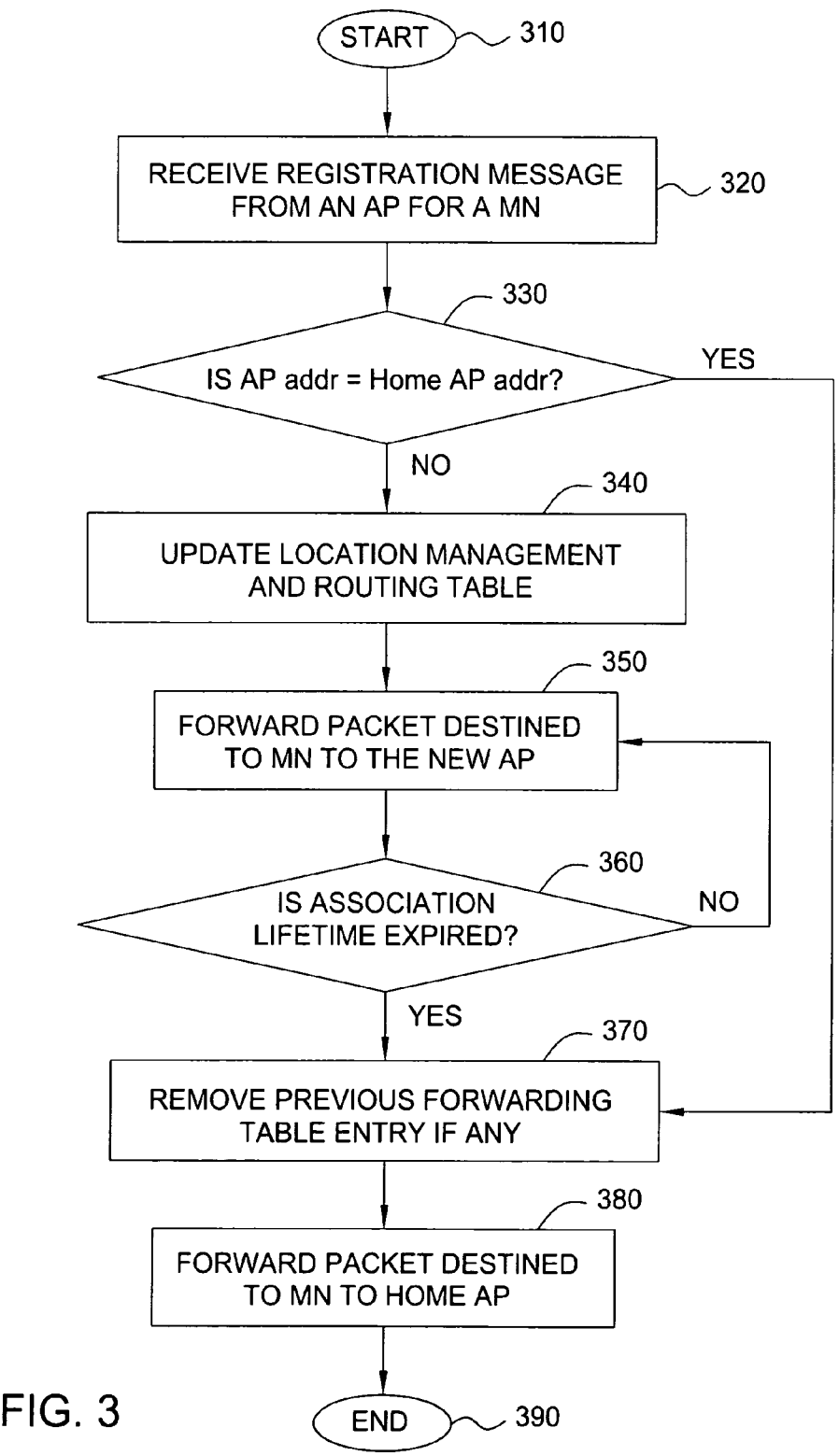
FIG. 3 illustrates a flowchart of a method for updating mobility management information by the network server of the present invention.

FIG. 3 illustrates a flowchart of a method 300 for updating mobility management information by the network server of the present invention. Method 300 starts in step 310 and proceeds to step 320.

In step 320, the method 300 receives a registration message from an AP serving an area in which the MN is residing. In step 330, the method 300 checks if the IP address of the AP that sends the registration message is the same as the IP address of the home AP of the MN. If the IP address is not the home AP IP address, the method proceeds to step 340; otherwise, the method proceeds to step 370. In step 340, the method 300 updates the location management and routing table tuple entry by populating it with the <permanent MN IP address, home AP IP address, new AP IP address, association lifetime> tuple. In step 350, the method 300 forwards and routes IP packets destined to permanent MN IP address towards the new AP using the new AP IP address. In step 360, the method 300 checks if the association lifetime timer (a predefined time duration that the MN is to be served by the new AP) has expired. If the lifetime timer has expired, the method 300 proceeds to step 370; otherwise, the method proceeds to step 350. In step 370, the method 300 removes any previous location management and routing table entry. In step 380, the method 300 forwards all packets destined to the permanent MN IP address to the home AP using the home AP IP address. The method 300 ends in step 390. It should be noted that method 300 presumes that each MN has previously registered its corresponding home AP, e.g., when the network server receives MN's registration for the very first time.

Figure 4:
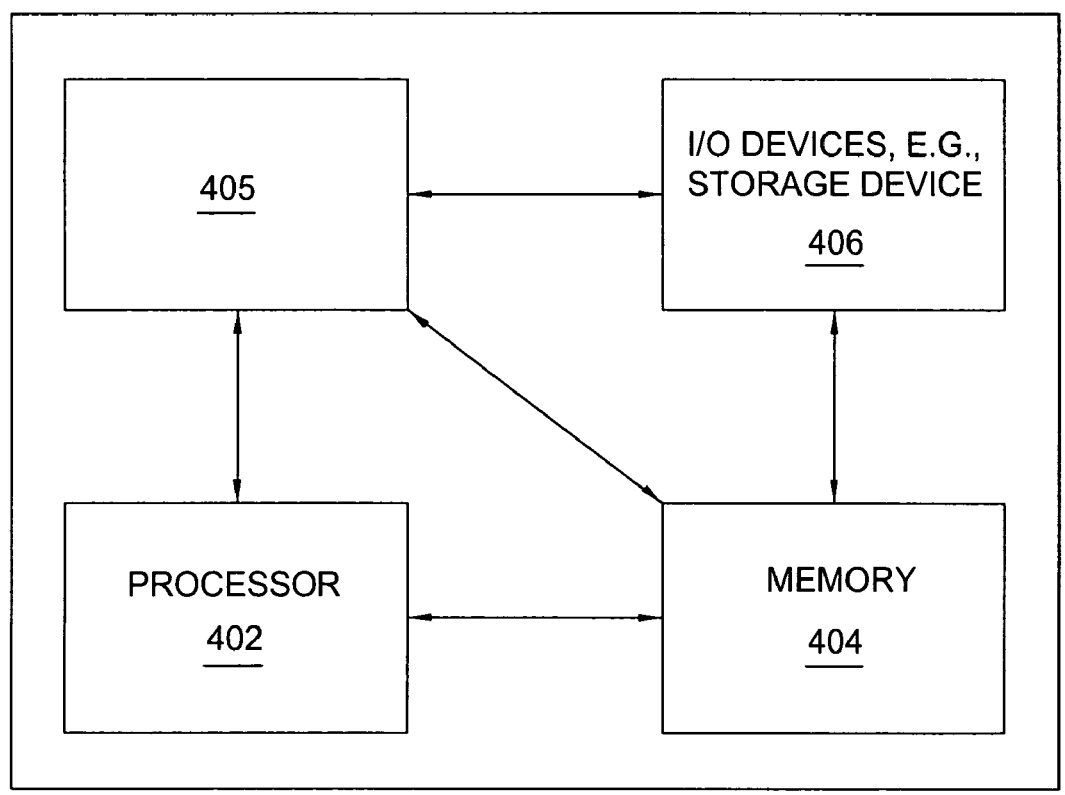
FIG. 4 illustrates a high level block diagram of a general purpose computer suitable for use in performing the functions described herein.

FIG. 4 depicts a high level block diagram of a general purpose computer 400 suitable for use in performing the functions described herein. As depicted in FIG. 4, the system 400 comprises a processor element 402 (e.g., a CPU), a memory 404, e.g., random access memory (RAM) and/or read only memory (ROM), a IP Mobility module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present IP Mobility module or process 405 can be loaded into memory 404 and executed by processor 402 to implement the functions as discussed above. As such, the present IP Mobility process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling mobility of a mobile node in a communication network, comprising:
pre-provisioning a first virtual private network (VPN) tunnel between a network server that performs address maintenance and translation and a first access point (AP);
pre-provisioning a second VPN tunnel between said network server and a home access point;
receiving a registration message from said first AP, where said registration message indicates that the mobile node is present in an area serviced by said first access point;
determining by a network server whether the mobile node is present within an area serviced by a home access point of the mobile node; and
routing by said network server at least one packet to the mobile node via said first VPN tunnel to said first access point if it is determined that the mobile node is present within said first access point, or routing by said network server at least one packet to the mobile node via said second VPN tunnel to said home access point if it is determined that the mobile node is present within said home access point, wherein said first VPN tunnel is a different VPN tunnel from said second VPN tunnel, wherein the mobile node maintains a same internet protocol (IP) address for communicating with said communication network regardless of whether the mobile node is present within said area serviced by said first access point or said area serviced by said home access point.

2. The method of claim 1, wherein said communication network is an internet protocol (IP) network.

3. The method of claim 1, wherein said IP address of the mobile node is assigned by its home access point.

4. The method of claim 1, wherein said first or said second VPN tunnel comprises at least one of: an Asynchronous Transfer Mode (ATM) virtual circuit (VC) or virtual path (VP), a Frame Relay VC, or a Multi-Protocol Label Switching (MPLS) Label Switched Path (LSP).

5. The method of claim 1, wherein said registration message is received whenever the mobile node enters a new access point.

6. The method of claim 1, wherein said determining comprises accessing a routing table pertaining to the mobile node, wherein said routing table comprises at least one of: an internet protocol (IP) address of the mobile node, an IP address of the home AP, an IP address of said first access point, and a time duration that the mobile node can be served by said first AP.

7. The method of claim 1, wherein said routing said at least one packet is performed by said network server while maintaining at least one existing mobile node application session and connection as the mobile node travels between a plurality of access points.

8. The method of claim 7, wherein said routing is performed using an internet protocol (IP) address of one of said plurality of access points that is currently serving the mobile node.

9. A computer-readable medium having stored thereon a plurality of instructions, the plurality of instructions including instructions which, when executed by a processor, cause the processor to perform the steps of a method for enabling mobility of a mobile node in a communication network, comprising:

pre-provisioning a first virtual private network (VPN) tunnel between a network server that performs address maintenance and translation and a first access point (AP);

pre-provisioning a second VPN tunnel between said network server and a home access point;

receiving a registration message from said first AP, where said registration message indicates that the mobile node is present in an area serviced by said first access point;

determining by a network server whether the mobile node is present within an area serviced by a home access point of the mobile node; and routing by said network server at least one packet to the mobile node via said first VPN tunnel to said first access point if it is determined that the mobile node is present within said first access point, or routing by said network server at least one packet to the mobile node via said second VPN tunnel to said home access point if it is determined that the mobile node is present within said home access point, wherein said first VPN tunnel is a different VPN tunnel from said second VPN tunnel, wherein the mobile node maintains a same internet protocol (IP) address for communicating with said communication network regardless of whether the mobile node is present within said area serviced by said first access point or said area serviced by said home access point.

10. The computer-readable medium of claim 9, wherein said communication network is an internet protocol (IP) network.

11. The computer-readable medium of claim 9, wherein said IP address of the mobile node is assigned by its home access point.

12. The computer-readable medium of claim 9, wherein said first or said second VPN tunnel comprises at least one of: an Asynchronous Transfer Mode (ATM) virtual circuit (VC) or virtual path (VP), a Frame Relay VC, or a Multi-Protocol Label Switching (MPLS) Label Switched Path (LSP).

13. The computer-readable medium of claim 9, wherein said registration message is received whenever the mobile node enters a new access point.

14. The computer-readable medium of claim 9, wherein said determining comprises accessing a routing table pertaining to the mobile node, wherein said routing table comprises at least one of: an internet protocol (IP) address of the mobile node, an IP address of the home AP, an IP address of said first access point, and a time duration that the mobile node can be served by said first AP.

15. The computer-readable medium of claim 9, wherein said routing said at least one packet is performed by said network server while maintaining at least one existing mobile node application session and connection as the mobile node travels between a plurality of access points.

16. The computer-readable medium of claim 15, wherein said routing is performed using an internet protocol (IP) address of one of said plurality of access points that is currently serving the mobile node.

17. An apparatus for enabling mobility of a mobile node in a communication network, comprising:

means for pre-provisioning a first virtual private network (VPN) tunnel between a network server that performs address maintenance and translation and a first access point (AP);

means for pre-provisioning a second VPN tunnel between said network server and a home access point;

means for receiving a registration message from said first AP, where said registration message indicates that the mobile node is present in an area serviced by said first access point;

means for determining by a network server whether the mobile node is present within an area serviced by a home access point of the mobile node; and means for routing by said network server at least one packet to the mobile node via said first VPN tunnel to said first access point if it is determined that the mobile node is present within said first access point, or routing by said network server at least one packet to the mobile node via said second VPN tunnel to said home access point if it is determined that the mobile node is present within said home access point, wherein said first VPN tunnel is a different VPN tunnel from said second VPN tunnel, wherein the mobile node maintains a same internet protocol (IP) address for communicating with said communication network regardless of whether the mobile node is present within said area serviced by said first access point or said area serviced by said home access point.

\* \* \* \* \*